Feb. 9, 1926.
H. BETTS ET AL
1,572,837
DISPENSING DEVICE
Filed August 7, 1923
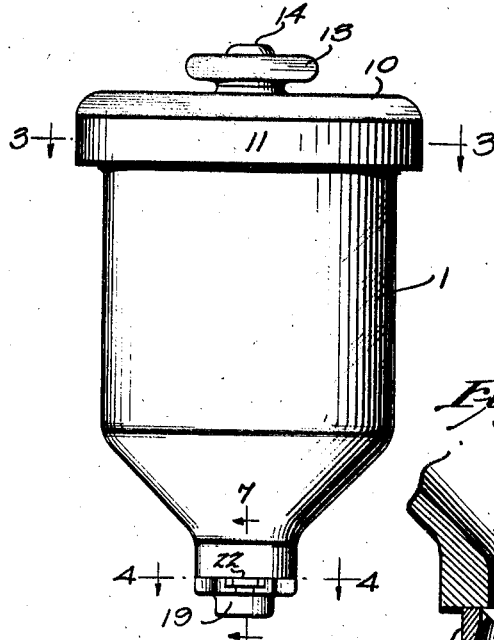
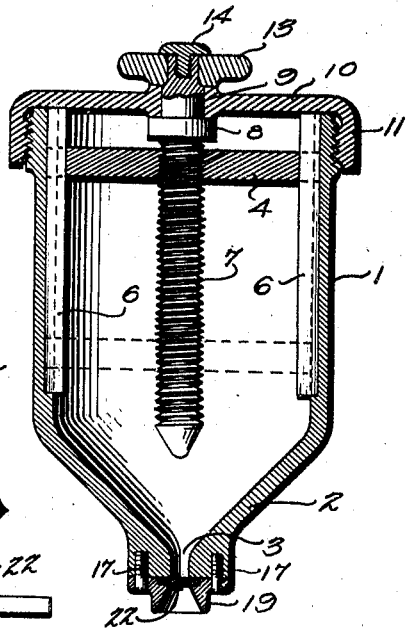
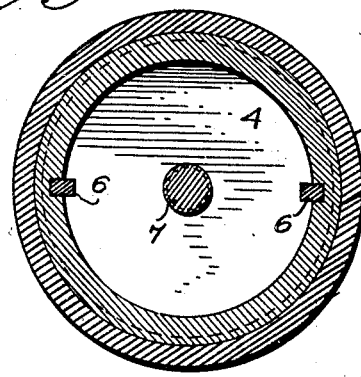
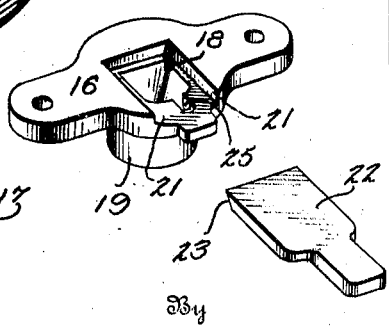
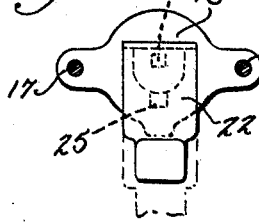
Inventor
HELEN BETTS
E. DAWSON BETTS Patented Feb. 9, 1926.

1,572,837

UNITED STATES PATENT OFFICE.

HELEN BETTS AND EDWARD DAWSON BETTS, OF PASSAIC, NEW JERSEY.

DISPENSING DEVICE.

Application filed August 7, 1923. Serial No. 656,247.

*To all whom it may concern:*

Be it known that we, HELEN BETTS and EDWARD DAWSON BETTS, citizens of the United States, residing at Passaic, in the county of Passaic and State of New Jersey, have invented certain new and useful Improvements in Dispensing Devices, of which the following is a specification.

This invention relates to dispensing devices and more particularly to devices for dispensing toilet pastes and creams, such as tooth paste, shaving cream, and the like.

An object of the invention is to provide a holder for dispensing pastes and creams in a sanitary and economical manner.

A further object is to provide means for delivering paste or cream to a brush whereby the paste or cream drops onto the brush and does not contact with any part of the device with which the brush may come in contact.

A further object is the provision of an improved outlet means by which the paste or cream is delivered.

In the accompanying drawings, we have shown one embodiment of the invention. In this showing:

Figure 1 is a front elevation,

Figure 2 is a central vertical sectional view,

Figure 3 is a horizontal sectional view on line 3—3 of Figure 1,

Figure 4 is a similar view on line 4—4 of Figure 1,

Figure 5 is a detail perspective view of the closure member,

Figure 6 is a similar view of the feeding device, and

Figure 7 is a vertical sectional view on line 7—7 of Figure 1.

Referring to the drawings, the reference numeral 1 designates a container or receptacle formed of any suitable material preferably circular in cross section and provided with a cone shaped bottom 2 having an outlet opening 3. A piston or follower 4 is arranged in the container and is provided with grooves 5 for the reception of keys or guides 6 mounted in the wall of the container and adapted to prevent the piston from rotating. The piston is provided with a centrally threaded opening for the reception of a threaded rod 7. This rod is provided with a collar 8 adjacent its upper end and a smooth round portion 9. The smooth round portion of the rod is adapted to be received in a cover 10 which, as shown, is provided with a threaded flange 11 adapted to engage threads on the top of the container. Beyond the smooth portion 9, the rod is provided with a squared end 12 adapted to receive a handle 13. This handle is retained in position by means of a set screw 14 received in an opening 15 in the end of the rod.

The outlet opening 3 is normally closed and a suitable guide member is arranged beneath the outlet. As shown, the guide member consists of a plate 16, adapted to be secured to the bottom of the container by suitable fastening elements 17. The plate is provided with a central opening 18 and a cylindrical member 19 extends downwardly in alinement with this opening. The inner wall of the cylindrical member tapers downwardly, as at 20. The plate 16 is cut out, as at 21, to form a guide for a cutter 22. As shown, the cutter is adapted to slide in the cut-out portion beneath the bottom of the container and is provided with a sharpened end 23 to sever the cream or paste projecting from the container from the remainder. The lower face of the cutter is provided with a pin or lug 24 adapted to be received in a groove or recess 25 in the cylinder 19, to limit the outward movement of the cutter.

The operation of the device will be apparent from the foregoing description. The smooth portion 9 of the rod is received in the cover 10 and forms a bearing to permit revolution of the rod. The rod is revolved by hand, the operator grasping the handle 13 and turning it. This moves the piston 4 downwardly forcing the contents of the container through the outlet opening 3. When the paste or other material is being removed, the cutter 22 is moved outwardly, as indicated in dotted lines in Figure 4 of the drawings, permitting the paste to pass through the interior of the cylinder 19. The brush is held beneath the cylinder and when the cutter 22 is moved inwardly, it severs the paste or cream and it falls on the brush. By providing the cylinder beneath the outlet opening, the paste is prevented from contact with any portion of the apparatus that is likely to come in contact with a brush.

It will be apparent that the device may be easily and cheaply manufactured, and will dispense tooth paste or similar substances sanitarily and asceptically. The user of the device may purchase the material in bulk, thus effecting an economy not possible where tooth paste in the usual collapsible tubes is used.

It is to be understood that the form of our invention herewith shown and described is to be taken as a preferred example of the same, and that various changes in the shape, size, and arrangement of parts may be resorted to without departing from the spirit of the invention or the scope of the subjoined claims.

Having thus described our invention, we claim:

1. In an apparatus of the character described, a container having an outlet opening at the lower end thereof, means for forcing the contents of said container toward said outlet opening, a plate arranged beneath said outlet opening, said plate being provided with an opening in alinement with said outlet opening, a cylinder depending from said plate in alinement with said openings, and a cutter member slidably mounted in said plate adjacent the opening in said container and normally closing the opening therein.

2. In an apparatus of the character described, a container having an outlet opening at the lower end thereof, means for forcing the contents of said container toward said outlet opening, a plate arranged beneath said outlet opening, said plate being provided with an opening in alinement with said outlet opening and being further provided with a transverse recess adjacent said outlet opening, a cutter member slidably mounted in said recess and adapted to close said outlet opening, and a cylinder depending from said plate and having an opening therein in alinement with the opening in said plate, the opening in said cylinder increasing in diameter toward its lower end.

3. In apparatus of the character described, a container having an outlet opening at the lower end thereof, means for forcing the contents of said container towards said outlet opening, a plate arranged beneath said outlet opening, said plate being provided with an opening in alinement with said outlet opening and being further provided with a transverse recess adjacent said outlet opening, a cutter member slidably mounted in said recess and adapted to close said outlet opening, a cylinder depending from said plate and having an opening therein in alinement with the opening in said plate, the opening in said cylinder increasing in diameter toward its lower end, said outlet opening and the openings in said plate and said cylinder forming a discharge outlet for material from said container, and a stop pin carried by said cutter member, said stop pin being arranged within said discharge outlet and adapted to engage a wall thereof to limit the opening movement of said cutter member.

In testimony whereof, we affix our signatures.

HELEN BETTS.
EDWARD DAWSON BETTS.